SERIAL DIGITAL DATA PROCESSING CIRCUIT

Filed May 31, 1957 3 Sheets-Sheet 1

INVENTOR
W. D. LEWIS
BY Alan C. Rose
ATTORNEY

SERIAL DIGITAL DATA PROCESSING CIRCUIT

Filed May 31, 1957 3 Sheets-Sheet 2

INVENTOR
W. D. LEWIS
BY Alan C. Rose
ATTORNEY

INVENTOR
W. D. LEWIS
BY Alan C. Rose
ATTORNEY

United States Patent Office 3,090,943

Patented May 21, 1963

3,090,943

SERIAL DIGITAL DATA PROCESSING CIRCUIT

Willard D. Lewis, Mendham, N.J., assignor to Bell Telephone Laboratories, Incorporated, New York, N.Y., a corporation of New York Filed May 31, 1957, Ser. No. 662,740
4 Claims. (Cl. 340—172.5)

This invention relates to data processing or "logic" circuits and has for its principal object increasing the speed of such circuits.

Data processing or logic circuits have been instrumented with relays, vacuum tubes, diodes, transistors, and even wave guides. A text entitlted "The Design of Switching Circuits" by William Keister et al., D. Van Nostrand Company, Inc., New York 1951, discusses the basic principles of switching and logic circuits, and discloses a few technologies in which they may be instrumented. In every technology which is employed, however, the need for speed eventually tests the response time of the switching components, and an apparent upper limit on the rate of performing switching operations is reached. In logic or data processing circuits in which output signals depend on signals received during previous digit periods, this limitation on switching speeds is accentuated by the time required for storage or regeneration operations.

In accordance with the present invention, I have discovered that the over-all speed of data processing circuits which include storage may be increased by providing high speed switching circuits for distributing input serial digital information into several channels. Each of the resultant pulse trains has a much slower digital repetition rate than the original serial digital information, as it includes only one digit for every two or more digits included in the original input signal. Several parallel slow speed logic circuits are also provided, and each of these circuits may have an associated storage circuit. Each of the input channels is coupled to each of the parallel logic circuits through appropriate delay circuits so that the slow speed pulse trains are synchronized at the inputs to the logic circuits. In addition, high speed output switching circuitry is provided to reassemble the desired high speed serial output signal from the individual slower output signals of the parallel logic circuits.

It is a feature of the invention that a plurality of slow speed logic circuits are connected to receive input high speed serial digital signals, and that the connecting circuitry includes a switching circuit for dividing the input signal into at least two slower speed trains of digital information, and additional circuitry for synchronizing the application of all of the slow speed trains to all of the parallel logic circuits.

In accordance with collateral features of the invention, each of the slow speed logic circuits in the circuit described above may be provided with at least one local storage circuit, and an additional switching circuit may be provided to combine the output signals from the logic circuits to form a single high speed serial output signal.

A complete understanding of this invention and of these and other features of the invention may be gained from a consideration of the following detailed description and the accompanying drawing, in which.

Figure 5:
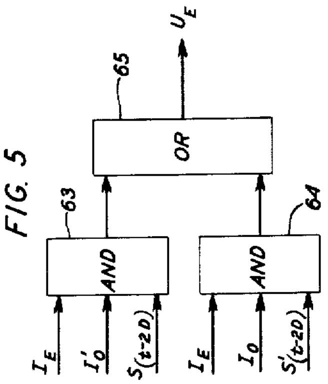
FIG. 5 shows a logic circuit diagram forming part of one of the blocks shown in FIG. 3.

In the course of the detailed description of the present drawings, frequent mention will be made of logic circuits such as AND circuits and OR circuits, and of Boolean algebra. In addition to the text mentioned above, logic circuits and Boolean algebra are discussed in an article by S. H. Washburn entitled "An Application of Boolean Algebra to the Design of Electronic Switching Circuits," which appears at pages 380 through 388 of the A.I.E.E. Transactions, Part I, Communications and Electronics, volume 72. Two fundamental circuits which are employed in logic circuitry are AND circuits and OR circuits. As indicated by its name, all of the inputs to an AND circuit must be energized in order to produce an output signal. For an OR circuit, however, the energization of any input produces an output signal. Another logic circuit operator which is of considerable usefulness is the negation circuit. A negation circuit transforms one binary input signal into the opposite type of output signal. Thus, in a system in which the binary symbols "1" and "0" are represented by a pulse and the absence of a pulse, respectively, a negation circuit would produce an output pulse in a given digit period when none was applied to its input, and would have no output when an input pulse was applied to it.

Boolean algebra is employed to represent a switching function or a logical proposition. Referring to the simple counter circuit of FIG. 1, the signal output and the signal to be applied to storage may be represented by the following Boolean algebraic expressions:

$$U_t = I_t \cdot S_{(t-D)} \qquad (1)$$

$$S_t = I_t \cdot S'_{(t-D)} + I'_t \cdot S_{(t-D)} \qquad (2)$$

where $U_t$ is the output signal, $I_t$ is the input signal, $S_t$ is the signal to storage, $S_{(t-D)}$ is the previous stored signal delayed by one digit period with respect to the input signal $I_t$, and the primed symbols represent the negated values of the corresponding unprimed symbols. It may also be noted that the subscripts "$t$" in the designations $U_t$ and $S_t$ indicate that the output signal $U_t$ and the signal to storage $S_t$ are derived from the input $I_t$ and signals applied to the logic circuit simultaneously with $I_t$. Thus, the signals $U_t$ and $S_t$ may not appear at the output of the logic circuit until a short time after the application of input signals.

Figure 1:
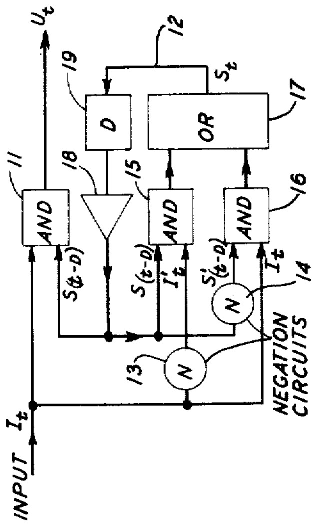
FIG. 1 shows a conventional single stage counter circuit.

In the instrumentation of Boolean algebraic equations, AND circuits are employed when multiplication operations are indicated, and OR circuits are used when addition operations are indicated by the equations. Thus, for example, Equation 1 indicates that an output signal $U_t$ should occur when both an input signal $I_t$ and a stored signal $S_{(t-D)}$ are present. In FIG. 1, the AND circuit 11 performs the function indicated by Equation 1.

A signal is to be applied to the storage output lead 12 in FIG. 1 when only one of the two possible inputs $I_t$ and $S_{(t-D)}$ are present. This is indicated in Boolean algebraic form in Equation 2. In Equation 2, the negated value of a given Boolean algebraic symbol is indicated by applying a prime to the symbol. In FIG. 1, the negated circuits 13 and 14 are employed to obtain the negated value of the signals $I_t$ and $S_{(t-D)}$, respectively. The operation indicated by Equation 2 is performed by the AND circuits 15 and 16 and by the OR circuit 17. The amplifier 18 is included in FIG. 1 to provide the necessary regeneration for cases when the stored pulse is circulated through the AND unit 15 and the OR unit 17 for a number of digit periods. The delay unit 19 is indicated in FIG. 1 to provide padding delay which is required for synchronous serial binary logic circuits. The delay 19 is selected so that the loop delay is exactly equal to one digit period, which is the minimum time interval between the arrival of successive pulses at the input $I_t$ to the circuit of FIG. 1.

At relatively high pulse repetition rates, logic circuits such as those shown in FIG. 1 reach a point at which they no longer operate accurately. Logic circuits of each technology which is employed reach a limit in their speed of operation above which numerous errors occur. The circuit of FIG. 2 indicates schematically one arrangement for overcoming this apparent top limit in pulse repetition rates for logic circuits. Thus, for example, high speed serial input signals may be applied to input lead 21, and high speed output signals appear at the output lead 22. The switching circuits 23 and 24 are associated with the input lead 21 and the output lead 22, respectively, and perform the function of changing a single high speed pulse train into a number of relatively slow pulse patterns, or vice versa. Thus, for example, the input lead 25 carries a train of pulses corresponding to every third pulse of the original serial binary signals applied to lead 21. Other interleaved sets of pulses are distributed to the input leads 26 and 27. The pulses applied to these leads 25, 26, and 27 are lengthened by the pulse stretching circuits 28, 29, and 30, respectively. All three trains of pulses are then applied to each of the three logic circuits 31, 32, and 33. To synchronize the arrival of the various trains of pulses at each of the logic circuits 31 through 33, the delay circuits 34 through 39 are provided. It may also be noted that a local storage loop, including an amplifier and a padding delay circuit, is associated with each of the logic circuits 31 through 33.

Figure 2:
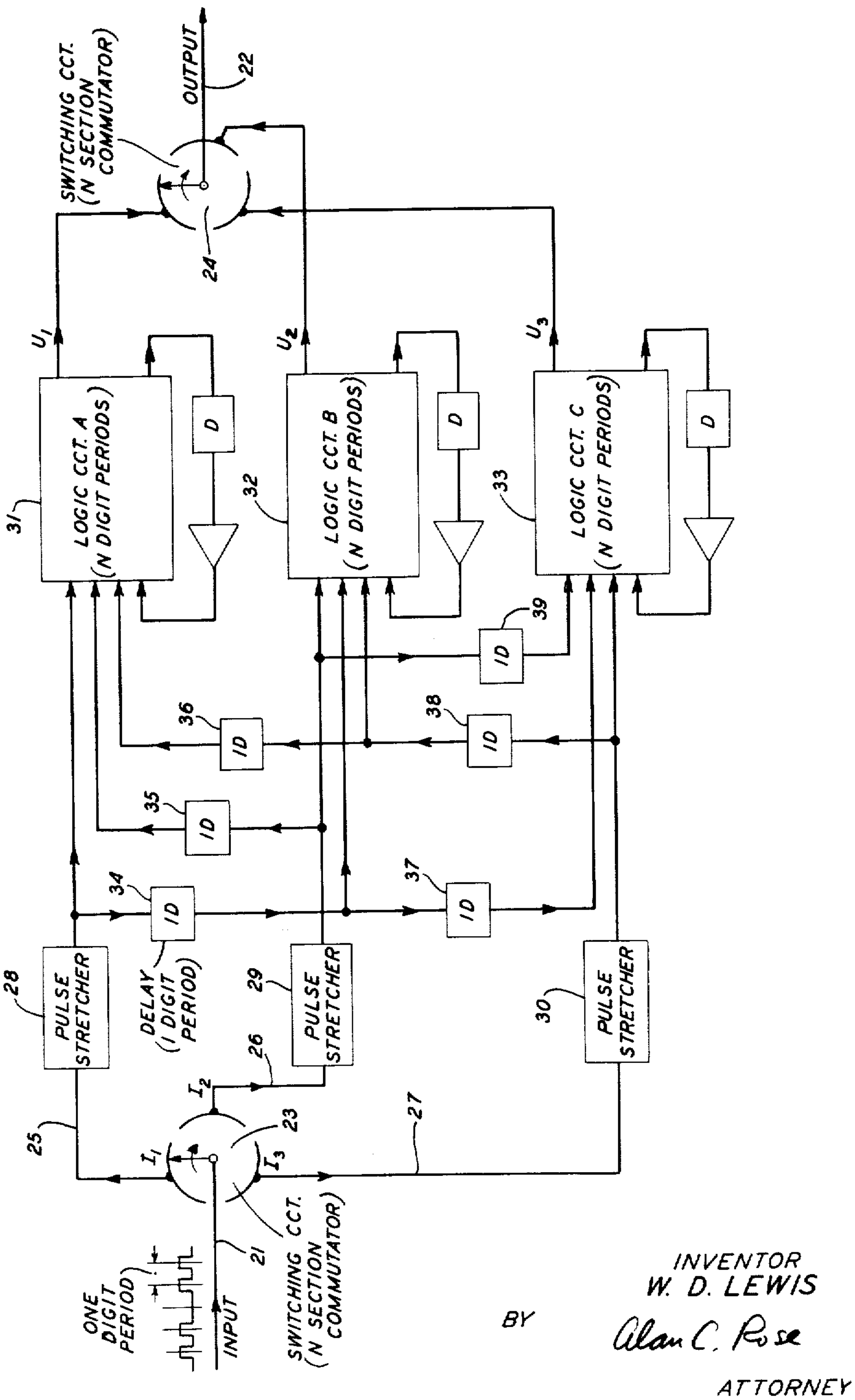
FIG. 2 is a block diagram of a data processing circuit in accordance with the invention.

In general, FIG. 2 represents schematically a solution to the problem of speed limitation of logic circuitry. It is based in part upon the recognition that systematic switching operations can be performed at a much higher rate than general logic circuit functions. It involves the further recognition that a plurality of slow logic circuits may be provided to perform the same logic circuit function of a single high speed logic circuit. Accordingly, in many technologies, when a single operation or set of operations is the "speed bottleneck" of a particular system, it may prove desirable to increase the rate of operation of the particular function, rather than to redesign the entire system for increased speed.

Now that the general considerations regarding the circuit of FIG. 2 have been mentioned, it is considered desirable to take a specific circuit and work out in some detail how its speed of operation may be increased. By way of example, it will be assumed that it is desired to increase the rate of speed of the simple single stage counter of FIG. 1 to twice its original rate of speed.

Figure 3:
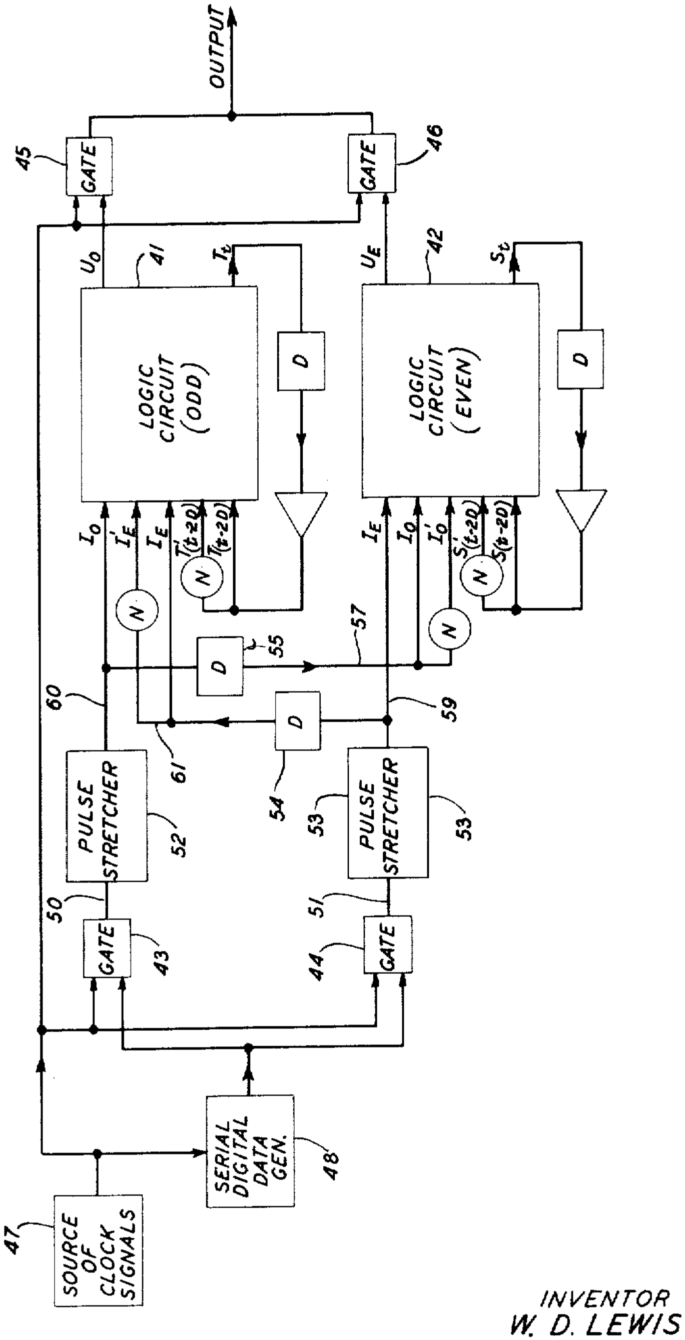
FIG. 3 is a block diagram of an electronic switching realization of the circuit of FIG. 2.

FIG. 3 is a block circuit diagram of a circuit of the type shown in FIG. 2 which includes two parallel logic circuits 41 and 42. In FIG. 3, the switching circuitry corresponding to the commutators 23 and 24 of FIG. 2 includes four gating circuits 43 through 46 and a source 47 of clock signals. The gates 43 through 46 may be diode gating circuits of the type disclosed in L. A. Meacham Patent 2,576,026, granted November 20, 1951. These gating circuits characteristically include oppositely poled diodes and a biasing source. Using an alternating current clock signal from the source 47, the gate 43 includes diodes poled in one sense to be responsive to a control voltage of one polarity, while the gate 44 includes diodes poled in the opposite sense to be responsive to signals of the other polarity. Thus, the gates 43 and 44 are opened alternately as the clock voltage input changes polarity. Similarly, the gate 45 and 46 are arranged to be operated alternately, in synchronism with the gates 43 and 44, respectively, to sample the output pulses from logic circuits 41 and 42. Another arrangement which may be employed to minimize energy loss in combining output pulse signals from the logic circuits 41 and 42 is disclosed in my copending application Serial No. 633,358, filed January 9, 1957, now Patent 2,936,337, granted May 10, 1960.

Figure 4:
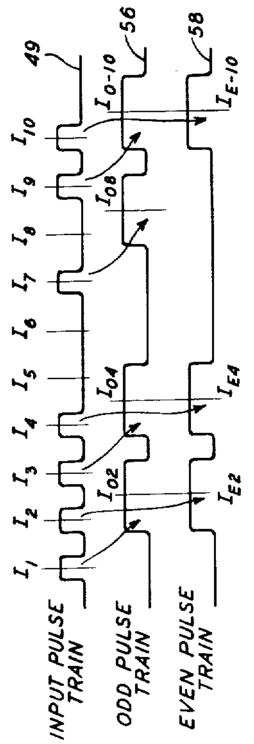
FIG. 4 represents pulse trains which appear at various points in the circuit of FIG. 3.

The input source of high speed digital signals is indicated in FIG. 3 by the block 48, which is designated a serial digital data generator. The output pulses from the data generator 48 are synchronized by the source 47 of clock signals. A representative train of output pulses from the serial digital data generator 48 is indicated in FIG. 4 by the upper train of pulses 49. As indicated in FIG. 4, the binary signals from the generator 48 are in the form of the presence or absence of pulses in successive digit periods. In FIG. 4, the input digit periods are designated $I_1$ through $I_{10}$. The gating circuits 43 and 44 of FIG. 3 route the digital information occurring in odd digit periods to the lead 50 and that occurring in even digit periods to the lead 51.

The pulse stretcher circuits 52 and 53 are associated with the leads 50 and 51, respectively, to lengthen the input pulses. A pulse stretching circuit could include a direct coupling path and a parallel branching path including a small amount of delay. The resulting pulse includes both the directly transmitted pulse and the overlapping pulse routed through the delay circuit, and is therefore somewhat longer than the original pulse. Alternatively, a suitable low pass filter may be employed in the pulse stretching circuits.

To synchronize the arrival of pulses from input leads 50 and 51 at the logic circuits 41 and 42, the one-digit delay circuits 54 and 55 are provided. In FIG. 4, the pulse train 56 represents the signals which appear on lead 57 at the output of the delay circuit 55; the pulse train 58 of FIG. 4 represents the signals on lead 59 at the output of the pulse stretcher 53. The pulse train designated 56 in FIG. 4 represents the digital information included in the odd digit periods of the original pulse train 49. This is indicated by arrows interconnecting the original pulses $I_1$, $I_3$, $I_7$, and $I_9$ to the pulses designated $I_{O2}$, $I_{O4}$, $I_{O8}$, and $I_{O-10}$, respectively, in the pulse train 56 of FIG. 4. Similarly, the even pulses $I_2$, $I_4$, and $I_{10}$ in the pulse train 49 have been broadened and separated from the odd pulse train to produce the pulses $I_{E2}$, $I_{E4}$, and $I_{E-10}$ in the even pulse train 58. It may be noted that by virtue of the one digit period of delay introduced by the delay circuit 55, the corresponding pulses in the pulse trains 56 and 58 are synchronized in time. Similarly, the two slow pulse trains appearing on leads 60 and 61 at the output of the pulse stretcher 52 and the delay circuit 54, respectively, are also synchronized in time, and have a digital repetition rate of one half the rate of the original pulse train from the digital data generator 48.

The technique for determining the exact nature of the logic circuits 41 and 42 of FIG. 3 will now be considered. In general, the procedure involves manipulating the Boolean algebraic expressions for the desired logic function to avoid the need for inputs which are not available. Thus, for example, referring to FIG. 1, it is assumed that the time required for a pulse to traverse the loop including the AND unit 15, the OR unit 17, the delay unit 19, and the amplifier 18 is greater than one digit period, but less than two digit periods. Accordingly, the signal from storage $S_{(t-D)}$ is not available at the input of the logic circuit one digit period after the application of input signals. In FIG. 1 and Equations 1 and 2, the signal from storage delayed by one digit period is designated by the symbol $S_{(t-D)}$. The signal from storage delayed by two digit periods is, however, available. This signal is designated $S_{(t-2D)}$. Now, the signal $S_{(t-D)}$ may be readily determined from the signal $S_{(t-2D)}$ and the various input signals which are available. The Boolean algebraic expressions for the output signal $U_t$ and the signal to be stored $S_t$ were presented in Equations 1 and 2. The functions $U_t$ and $S_t$ given in Equations 1 and 2 depend on the value of $S_{(t-D)}$, which is not immediately available. However, from Equation 2 the following equation for $S_{(t-D)}$ may be readily developed, by referring the equation to an earlier digit period.

$$S_{(t-D)}=I_{(t-D)}\cdot S'_{(t-2D)}+I'_{(t-D)}\cdot S_{(t-2D)} \qquad (3)$$

Equations 1 and 2 may now be rewritten through the substitution of the value of $S_{(t-D)}$ given in Equation 3. The resulting expressions for $U_t$ and $S_t$ will then only depend on the input signals at the present time and delayed by one or more digit periods, and the signal from storage delayed by at least two digit periods with respect to the timing of the input signals. These equations are set forth below:

$$U_t=I_t(I_{(t-D)}\cdot S'_{(t-2D)}+I'_{(t-D)}\cdot S_{(t-2D)}) \qquad (4)$$

$$S_t=I_t(I_{(t-D)}\cdot S_{(t-2D)}+I'_{(t-D)}\cdot S'_{(t-2D)}) +I'_t(I_{(t-D)}\cdot S'_{(t-2D)}+I'_{(t-D)}\cdot S_{(t-2D)}) \qquad (5)$$

Equations 4 and 5 have reference to the original train of input signals, and signals which are delayed by the indicated number of digit periods with respect to the original input signal.

The next step is to translate Equations 4 and 5 into Boolean algebraic expressions employing the odd and even pulse trains shown in FIG. 4 at 56 and 58. The input signals to the even logic circuit 42 will be considered initially. These appear on leads 57 and 59 and correspond to the pulse trains 56 and 58 in FIG. 4. Now, the input signal $I_O$ (representing the odd input signal) which appears on lead 57 has been delayed by one digit period with respect to the input signal $I_E$ (representing the even input signal) which appears on lead 59. Accordingly, in the following equations $I_E$ is substituted for the input signal $I_t$ of Equations 4 and 5, and $I_O$ is substituted for $I_{(t-D)}$. The resulting equations for the output signal $U_E$ and the signal $S_t$ to be applied to storage for the logic circuit 42 are as follows:

$$U_E=I_E(I_O\cdot S'_{(t-2D)}+I'_O\cdot S_{(t-2D)}) \qquad (6)$$

$$S_t=I_E(I_O\cdot S_{(t-2D)}+I'_O\cdot S'_{(t-2D)}) +I'_E(I_O\cdot S'_{(t-2D)}+I'_O\cdot S_{(t-2D)}) \qquad (7)$$

A similar pair of equations are given below for the output signal $U_O$ and the signal to storage $T_t$ which are developed by the "odd" logic circuit 41 of FIG. 3.

$$U_O=I_O(I_E\cdot T'_{(t-2D)}+I'_E\cdot T_{(t-2D)}) \qquad (8)$$

$$T_t=I_O(I_E\cdot T_{(t-2D)}+I'_E\cdot T'_{(t-2D)}) +I_O(I_E\cdot T'_{(t-2D)}+I'_E\cdot T_{(t-2D)}) \qquad (9)$$

Figure 6:
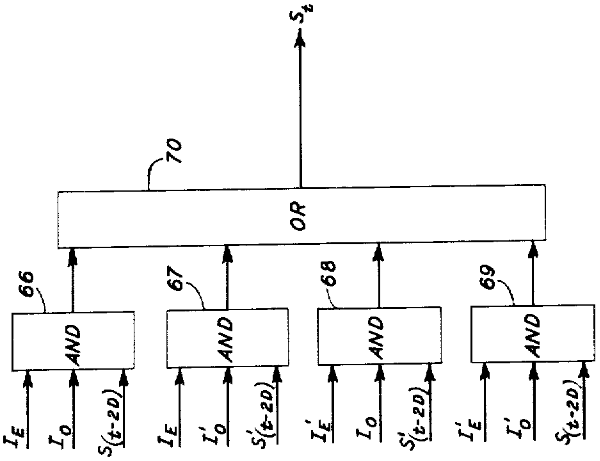
FIG. 6 is a logic circuit diagram showing another portion of one of the blocks of the circuit of FIG. 3.

The conventional logic circuit instrumentations of the Boolean algebraic Expressions 6 and 7 are shown in FIGS. 5 and 6. The expression for the output signal $U_E$ may be instrumented by the two AND circuits 63 and 64 and the OR circuit 65. For simplicity in instrumentation, the factor $I_E$ in Equation 6 has been added as an input to each of the AND circuits 63 and 64. In this manner, only two AND circuits and one OR circuit are required, and the use of an additional AND circuit is avoided. Equation 7 may be instrumented as indicated in the logic circuit diagram of FIG. 6. The circuit of FIG. 6 includes the four AND circuits 66, 67, 68, and 69 and the OR circuit 70. The inputs to each of the AND circuits 66 through 69 correspond respectively to the three factors of each of the terms which would result from expansion of the expression given on the right-hand side of Equation 7. The circuits shown in FIGS. 5 and 6 are incorporated in the even logic circuit 42 shown in FIG. 3. In a similar manner, a substantially identical set of logic circuits is incorporated in the logic circuit 41. The circuits included in the block 41 of FIG. 3 are arranged to implement the functions set forth in the Boolean algebraic Expressions 8 and 9.

With the arrangements of FIG. 3 as indicated in the foregoing paragraphs, the resultant circuit can now operate at twice the speed of the original circuit of FIG. 1. This has been made possible by the use of the two parallel logic circuits 41 and 42 of FIG. 3, and the use of the high speed switching circuitry for distributing the digital input signals to the two parallel channels and for reassembling the high speed digital output signals.

In the foregoing description of FIG. 3, the principles of the invention have been set forth in terms of a specific circuit realization of a single logic function. In the following paragraphs, a generalized analysis of the principles of the invention will be presented. Initially, the following Equations 10 and 11 are generalized expressions corresponding to the specific Equations 1 and 2 set forth above.

$$U_t=U_1(I_t, S_{(t-D)}) \qquad (10)$$

$$S_t=S_1(I_t, S_{(t-D)}) \qquad (11)$$

In the foregoing expressions, $U_t$ and $S_t$ are the signal and storage output signals, respectively; $U_1$ and $S_1$ represent combinational logic circuit functions; $I_t$ is the input digital signal at a reference time; and $S_{(t-D)}$ is the digital signal from the storage loop resulting from input signals applied to the logic circuit one digit period prior to the reference time. However, assuming that $S_{(t-D)}$ is not available because of the delay of the logic circuit and the delay loop, but that $S_{(t-2D)}$ is available, then the expression for $S_{(t-D)}$ is as follows:

$$S_{(t-D)}=S_1[(I_{(t-D)}), S_{(t-2D)})] \qquad (12)$$

Accordingly, the expression for $U_t$ may be obtained by combining Equations 10 and 12 as follows:

$$U_t=U_1[I_t, S_1(I_{(t-D)}, S_{(t-2D)})] \qquad (13)$$

Similarly, the expression for $S_t$ in terms of $S_{(t-2D)}$, $I_t$, and $I_{(t-D)}$ may be obtained by combining Equations 11 and 12:

$$S_t=[I_t, S_1(I_{(t-D)}, S_{(t-2D)})] \qquad (14)$$

If the logic circuit and the regenerative storage loop include three digit periods of delay, $S_{(t-3D)}$ is available to use, but neither $S_{(t-D)}$ nor $S_{(t-2D)}$ is available. The expression for the signal output $U_t$ is then as follows:

$$U_t=U_1[I_t, S_1\{I_{(t-D)}, S_1(I_{(t-2D)}, S_{(t-3D)})\}] \qquad (15)$$

In the foregoing Equation 15 the expression $$S_1(I_{(t-2D)}, S_{(t-3D)})$$

is, of course, equal to $S_{(t-2D)}$, and then $S_1(I_{(t-D)}, S_{(t-2D)})$ is equal to $S_{(t-D)}$.

In Equations 13 and 15, the expressions for the output signal $U_t$ were presented for the cases in which the storage loop includes two or three digit periods of delay, respectively. The following expressions for the output signal $U_t$ and the signal to storage $S_t$ apply to the generalized case when the logic circuit and the storage loop include $p$ digit periods of delay:

$$U_t=U_1[\![I_t, S_1[I_{(t-D)}, S_1\{I_{(t-2D)}, \ldots \ldots S_1(I_{(t-pD+D)}, S_{(t-pD)}) \ldots \}]]\!] \quad (16)$$

$$S_t=S_1[\![I_t, S_1[I_{(t-D)}, S_1\{I_{(t-2D)}, \ldots \ldots S_1(I_{(t-pD+D)}, S_{(t-pD)}) \ldots \}]]\!] \quad (17)$$

Equation 16 is merely an extension of Equations 13 and 15. Thus, for example, Equation 16 could be made identical with Equation 15 by substituting the digit 3 for the symbol $p$ in Equation 16. Equation 17 is the generalized expression for the signal to storage $S_t$ corresponding to the Equation 14.

Equations 16 and 17 are generalized expressions corresponding to Equations 4 and 5, respectively. To see the equivalence between these two sets of equations, however, it must be noted that $p$ in Equations 16 and 17 is the integer "2" in Equations 4 and 5. In addition, the functions $U_1$ and $S_1$ of Equations 16 and 17 are the logic functions of a one stage counter circuit, and are written out in detail in Equations 4 and 5.

Now, in the present circuits it may be noted that the number of input channels is normally equal to the number of digit periods of delay introduced by each of the parallel logic circuits, from the input of the logic circuit, through the logic circuit to the output of the storage delay loop. Thus, for example, in FIG. 2 the logic circuits 31 and 32 with their associated delay loops introduce three digit periods of delay, and three input channels 25, 26, and 27 are provided. Similarly, in FIG. 3 the circuits 41 and 42 and their associated delay loops have a total delay of two digit periods, and two input channels 50 and 51 are provided.

In general, therefore, the input signals $I_t$, $I_{(t-D)}$, . . . $I_{(t-pD)}$ are provided at the various input channels. All of these input signals are then coupled to each of the logic circuits and provide the necessary inputs to the logic circuits. The signal from storage $S_{(t-pD)}$ is also available from each logic circuit, and completes the required inputs to each logic circuit.

It is to be understood that the principles of the present invention are also applicable to logical circuit functions in which several high speed input trains of information are required. When several input trains of information are provided, duplicate input switching circuits for transforming the high speed pulse trains into a plurality of slower speed pulse trains are employed. All of the resultant slow speed pulse trains are then coupled to the required group of parallel logic circuits. Depending on their required number of output signals, one or more switching circuits are also required to reassemble the high speed digital output signals.

It is also contemplated that each of the logic circuits may be provided with more than one storage delay loop when the basic logic circuit requires more than one bit of storage. In each case, however, the circuit connections for the various storage loops would be developed in accordance with the techniques set forth above for the examples in which a single delay loop is employed.

Certain factors which distinguish the present switching circuits from related circuits which have been proposed heretofore include the continuous processing of input digital information and the developing of output signals in successive digit periods. In addition, the parallel logic circuits which are employed are substantial duplicates of one another, and include no interconnections. This symmetry of the component parallel circuits means that pulses may be initially applied to any one of the circuits without changing the resultant train of high speed output pulses which is produced.

Reference is made to my copending application Serial No. 615,364, filed October 11, 1956, now Patent 2,942,192, granted June 21, 1960, wherein a related invention is disclosed.

It is to be understood that the above-described arrangements are illustrative of the application of the principles of the invention. Numerous other arrangements may be devised by those skilled in the art without departing from the spirit and scope of the invention.

What is claimed is:

1. In a high speed compound logic circuit for processing digital signal information supplied in successive digit periods, first and second logic circuits for processing digital information at digital input repetition rates of one digit every two digit periods, a signal source supplying digital information in successive digit periods, said digital signals being grouped in accordance with their occurrence in two interleaved sets of digit periods, first and second input circuits, a first switching means for applying the first of said groups of input signals only to said first input circuit and for applying the second of said groups only to said second input circuit, circuit means connecting both of said input circuits to both of said logic circuits for coupling said first and second groups of input signals to both of said logic circuits, said circuit means including delay circuit means for synchronizing the arrival of digital signal information at each logic circuit from said two input circuits, and a second switching means synchronized with said first switching circuit for converting the outputs from said two logic circuits into serial digital output signals in successive digit periods.

2. In combination, data generation means for supplying a continuous train of high speed digital input information, a plurality of signal transmission channels, switching means for applying successive sets of interleaved digits of said input information to respectively different ones of said signal transmission channels, a pulse stretching circuit connected in series with each of said channels, a plurality of parallel logic circuits, each of said logic circuits being isolated from each other and including means for producing output signals which are different from and which are a function of input signals applied to the logic circuits, means including delay circuits for connecting each of said channels to each of said logic circuits and for synchronizing the arrival of pulses from each of said channels at each of said logic circuits, a high speed output circuit, and additional switching means synchronized with said first-mentioned switching means for gating the output signals from each of said parallel logic circuits to said high speed output circuit.

3. In a high speed compound logic circuit for processing a digital signal information supplied in successive digit periods, first and second logic circuits for processing digital information at digital input repetition rates of one digit every two digit periods, an input signal source supplying digital information signals in successive digit periods, said digital signals being grouped in accordance with their occurrence in two interleaved sets of digit periods, first and second input circuits, a first switching means for applying the first of said groups of input signals only to said first input circuit, and for applying the second of said groups only to said second input circuit, circuit means for connecting both of said input circuits to both of said logic circuits, each of said logic circuits being isolated from the other and including means for producing output signals which are different from and a function of the applied input signals, said circuit means including delay circuit means for synchronizing the arrival of digital signal information at each logic circuit from said two input circuits, and a second switching means synchronized with said first switching means for converting the output signals from said two logic circuits into serial digital output signals in successive digit periods.

4. In a high speed compound logic circuit for processing digital signal information supplied in successive digit periods, a plurality of logic circuits for processing digital information signals at repetition rates equal to or less than one digit every two digit periods, an input source for supplying digital signals in successive digit periods, said input digital signals being grouped in accordance with their occurrence in interleaved sets of digit periods, a plurality of input circuits corresponding in number to said plurality of logic circuits, a first switching means for applying individual groups of said digital signals to respectively different specific input circuits, circuit means for connecting all of said input circuits to all of said logic circuits, each of said logic circuits being isolated from each other and including means for producing output signals which are different from and a function of the applied input signals, said circuit means including delay circuit means for synchronizing the arrival of digital signal information at each logic circuit from each input circuit, and a second switching means synchronized with said first switching means for converting the output signals from said logic circuits into serial digital output signals in successive digit periods.

References Cited in the file of this patent

UNITED STATES PATENTS

| | | |
|---|---|---|
| 2,403,561 | Smith | July 9, 1946 |
| 2,725,470 | Houghton | Nov. 29, 1955 |
| 2,762,949 | Huffman | Sept. 11, 1956 |
| 2,779,933 | Bradburd | Jan. 29, 1957 |
| 2,845,609 | Newman | July 29, 1958 |
| 2,922,151 | Reiling | Jan. 19, 1960 |